United States Patent [19]

Thompson

[11] Patent Number: 5,033,997
[45] Date of Patent: Jul. 23, 1991

[54] ACTUATOR WITHOUT THROUGH SHAFT

[75] Inventor: Gary B. Thompson, Cherry Valley, Ill.

[73] Assignee: Sundstrand Corporation, Rockford, Ill.

[21] Appl. No.: 387,985

[22] Filed: Aug. 1, 1989

[51] Int. Cl.⁵ .......................................... F16H 57/10
[52] U.S. Cl. ..................................... 475/332; 475/342
[58] Field of Search ........................ 475/332, 342, 346

[56] References Cited

U.S. PATENT DOCUMENTS

| | | | |
|---|---|---|---|
| 1,730,270 | 10/1929 | Friedell | 475/342 |
| 3,513,715 | 5/1970 | Whitfield | 475/346 |
| 3,550,469 | 12/1970 | Morse | 475/332 |
| 3,640,150 | 2/1972 | Leiner et al. | 475/332 |
| 3,737,000 | 6/1973 | Knobloch et al. | 475/342 |
| 4,721,016 | 1/1988 | Burandt | 475/342 |
| 4,742,730 | 5/1988 | Dorn et al. | 475/332 |
| 4,843,912 | 7/1989 | Quick | 475/342 |

Primary Examiner—Dirk Wright
Attorney, Agent, or Firm—Antonelli, Terry, Stout & Kraus

[57] ABSTRACT

An actuator (10) comprises a housing (40) with movable actuating arms (22, 27, 28) adapted to be attached to a part to be moved. A reduction gear mechanism (14, 15) is held within the housing (40) in such a manner that it is axially and radially retained in the proper operative position without the need for a center through-shaft at the center (25) of the housing (40). The housing (40) is provided with openings at axial ends (31, 32). Z-shaped annular flanges (33, 34) are fixed to the housing (40) and securely receive dust covers (35) when the actuator (10) is shipped for installation. A seal land (36) is formed at the inner periphery of each flange (33, 34) adapted to engage with a drive shaft (11) which is inserted into one of the axial ends (31, 32) after removal of the appropriate dust cover (35).

23 Claims, 1 Drawing Sheet

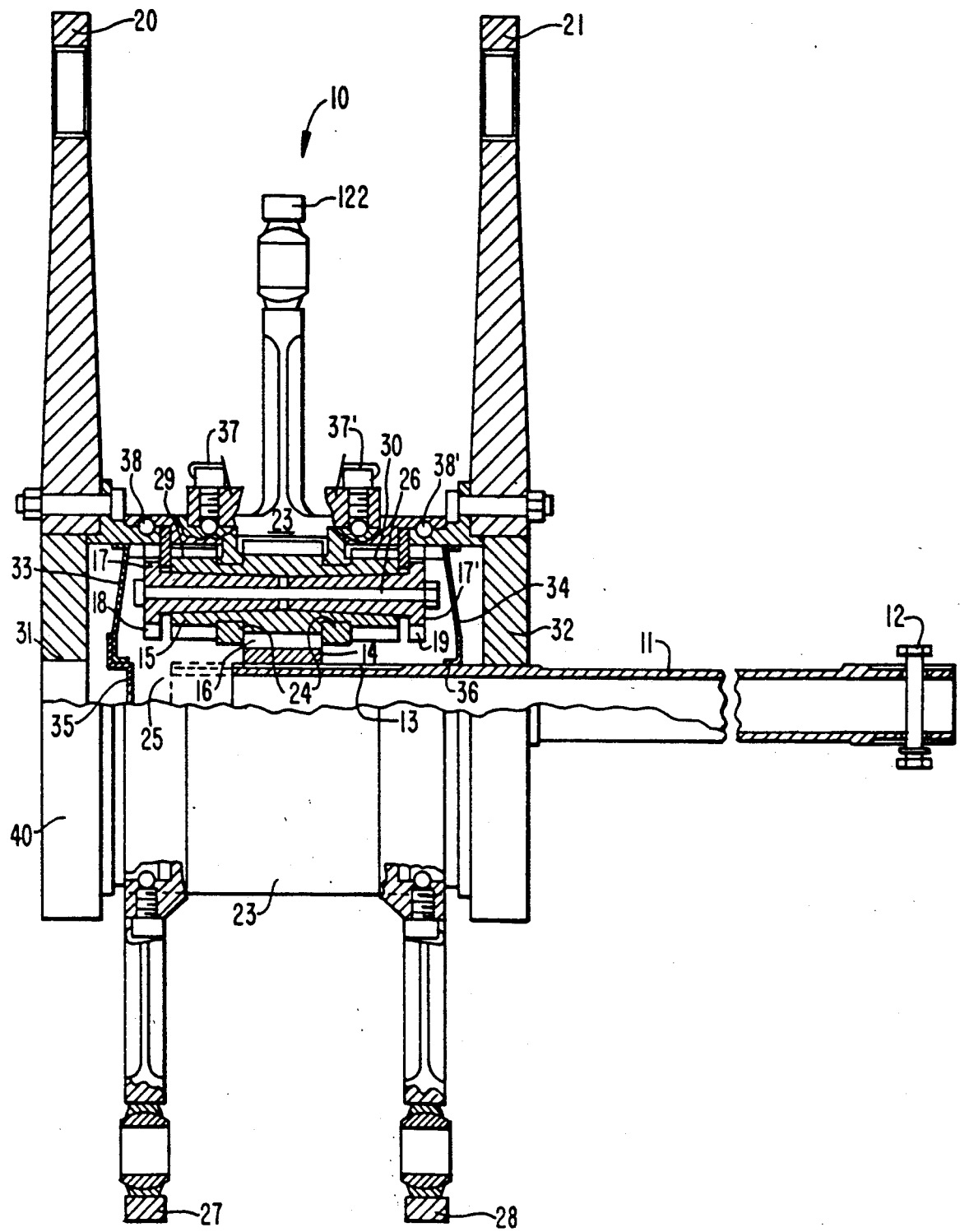

ACTUATOR WITHOUT THROUGH SHAFT

TECHNICAL FIELD

The present invention relates to an actuator and, more particularly, to an improved actuator used, for example, to position one or more aircraft flight surfaces from a remotely located power drive unit. The actuator is configured so that the drive shaft can be removed completely from the system without the need for a through shaft remaining in the center of the actuator housing to retain the gearing mechanism in position, and further so that the drive shaft can be inserted into either side of the actuator depending upon the particular installation requirements.

BACKGROUND ART

Geared rotary actuators of the conventional type used to position aircraft flight surfaces or the like are driven through drive shafts from a drive unit which is located at a position relatively remote from the surfaces to be positioned. Heretofore, conventional actuators have used central through shafts which are a permanent part of the actuator structure and which accept rotation from the drive shafting system and couplings to connect the systems to a gear reduction mechanism. Although these actuators do perform the needed positioning function, they are relatively complex, heavy and require extraneous components to support, locate and return the drive shafts and actuator shaft. Therefore, they tend to be more costly and less reliable.

In particular, actuator mechanisms have employed grounded ring gears with a center ring gear therebetween. A planet gear in the actuator housing would be arranged in meshing engagement with the center ring gear and with the end ring gears. A shaft journaled at each end in a housing was provided with a gear connected to the shaft either by being mounted on a splined section or cut directly into the shaft. Such an actuator is self-contained and will have a shaft with a spline on it so that a coupling can be put on it and drive off to the next actuator. Alternatively, it could have a female coupling. This type of arrangement required an independent external shaft which mounted in or to the internal shaft inside the actuator housing. However, this is a relatively complex arrangement in which the bearings used for the internal shaft serve no additional function.

It is also known to put journal bearings between the end ring gears and the center ring gear to keep the gears centered. Other arrangements have an axial bearing which requires additional structure to hold them together.

Furthermore, conventional actuators have used flanges at either or both ends of the central through-shaft so that a drive shaft can be bolted to the through shaft for operational purposes. Again, this arrangement makes the actuator more cumbersome and unnecessarily complicates installation of the actuator system.

All such prior actuators were unduly complex and heavy due to the presence of the central shaft and the need to connect a separate drive shaft to the actuator with consequent alignment problems.

DISCLOSURE OF THE INVENTION

It is an object of the present invention to overcome the problems and disadvantages encountered in conventional actuators.

It is an object of the present invention to simplify and reduce the weight of an actuator and its associated shafting system by providing built-in axial retention from ring gear to ring gear, thereby eliminating the need for center retention by means of a permanently installed shaft. An advantage of such an arrangement is that the complexity occasioned by supports and retainers for the shafting system is eliminated, resulting in a simpler, lighter, less costly and more reliable actuator.

It is another object of the present invention to accommodate misalignments in the shaft systems in an uncomplicated manner and to permit the drive shaft directly to drive a sun gear in a reduction gearing system of the actuator.

It is still another object of the invention herein disclosed to provide for easy access to the drive shaft.

It is yet another object of the present invention to provide a drive shaft which can be used in alternative installations and eliminate the need for two or more shafts between the actuator and the power drive unit.

Another advantage of the present invention is the elimination of a separate through-shaft which would otherwise have to be connected through bolting or the like to a drive shaft.

These and further objects and advantages have been achieved by independent axial and radial retention of the gearing mechanism and the elimination of a permanently installed central shaft in an actuator and the utilization of a shaft which can be splined or the like at each end for transmitting rotation and torque from a power drive unit to a reduction mechanism of the actuator. Ball bearing races on the actuator housing and actuator arm(s) are provided so that the bearing is self-contained. When the balls have been assembled in the bearing races, the assembly comprising the housing, the arm(s) and the gearing mechanism remain together in an operative relationship so that there is nothing such as a center shaft needed in the middle to hold the assembly together.

Another feature of the present invention resides in the use of splines at each end of the shaft as a simple way of providing clearances which accommodate misalignments in the shafting system.

A further feature of the present invention is the ability to insert and withdraw the drive shaft from the actuator housing to facilitate shipping, handling and installation.

The actuator of the present invention also allows either end of the actuator to have the drive shaft inserted therein by the use of a sealing plug or dust cover inserted into an axial end of the actuator. As a result, with the use of approximately splined or configured drive shafts, actuators can be daisy-chained from a single power unit in a simple and effective manner.

The present invention further contemplates sizing the spline provided at the actuator end of the drive shaft to be of sufficient length to allow the shaft to be inserted beyond the normal installation position for installation of the actuator or of the power drive unit.

An additional feature of the present invention is the utilization of axial shaft retention with a simple cross bolt at the power drive end unit.

A further feature is the provision of a seal land provided at the actuator end of the drive shaft so as to accommodate an elastomeric shaft seal for excluding contamination from the actuator.

BRIEF DESCRIPTION OF THE DRAWING

These and other features, objects and advantages of the present invention will become more apparent from the following description when taken in conjunction with the accompanying drawing which shows a presently preferred embodiment of the present invention and wherein the sole FIGURE is an elevation view in partial cross-section of the actuator structure and shaft in accordance with the present invention.

BEST MODE FOR CARRYING OUT THE INVENTION

Referring to the FIGURE, there is shown an actuator mechanism designated generally by the numeral 10. A drive shaft 11 shown hollow in this embodiment has a cross bolt 12 in a splined section at an end to be connected to the power drive unit (not shown) and a splined section 13 at the other end for insertion into the actuator housing. The conventional splines in the splined section 13 of the drive shaft 11 form-lockingly engage in the circumferential direction a sun gear 14 forming part of the gear reduction mechanism within the actuator housing. The splines of each end of the shaft provide an easy and inexpensive method to join the shaft to the actuator and to the power drive unit without undue concern about misalignment. The teeth of the sun gear 14 mesh with centrally located teeth 16 of an elongated planet gear 15 which is rotatably mounted on conically shaped hubs 17, 17' having gear teeth 18, 19 at each respective axial end.

The particular reduction gear mechanism utilized is not essential to the principles of the present invention. The mechanism can take the form of any conventional epicyclic train to accomplish actuation. In the illustrated embodiment, for example, the sun gear 14 rotates the planet gear 15 which is grounded at each end to the actuator housing and causes the actuator arms to rotate in a scissor-like manner as hereinbelow described. It will be seen that the actuator housing and arms have self-contained conventional bearings and radial retention rings also described below to maintain the gear mechanism in its desired axial and radial position witout the presence of a central shaft to support the sun gear 14.

The actuator mechanism 10 has a housing 40 with mounting arms 20, 21 which are grounded to a structure such as an aircraft frame. An output arm 22 between the mounting arms 20, 21 is connected in a known manner with the part or system to be actuated, e.g. an aircraft control surface. The output arm 22 is integral with a central annular member 23 to form a T-shaped cross-section. The member 23 is provided with teeth in a known manner to engage with and be rotationally driven by respective meshing teeth on the planet gear 15, again in a conventional manner.

Radial support rings 24 are provided on each side of the sun gear 14 and of centrally located teeth 16 of the planet gear 15. The radial support rings maintain the gear reduction mechanism in proper radial orientation with respect to the member 23 in the absence of shaft 11 in the space 25. The planet gear 15 is part of the reduction gear assembly comprising a shaft 26 upon which the two hubs 17, 17' are rotatably mounted. The sun and planet reduction gear mechanism is sized in a standard manner to provide a relatively high gear ratio reduction with the result that as the actuator drives the sun gear 14 through the drive shaft 11, the output arm 22, which is connected to a link or the like (not shown) actuates a mechanism such as a control surface of an aircraft for precise positioning and with sufficient torque and rotational speed. Of course, it will be appreciated that the output arm can be used to actuate any device or system quite apart from control surfaces associated with aircraft.

In the embodiment shown, there are also shown two additional output arms 27, 28 rotationally associated with the body of the actuator mechanism between the actuator housing and the central annular member 23. The output arm 22 and the two opposed output arms 27, 28 are rotationally journaled to the body by standard self-contained bearings 37, 37' between the member 23 and the output arms 27, 28, respectively, and bearings 38, 38' between the arms 27, 28 and the actuator housing 40, respectively. In this embodiment, the pair of actuators 27, 28 are arranged to rotate in a direction opposite to that of the single output arm 22 as previously mentioned. In other words, the output arm 22 can rotate clockwise while the pair of output arms 27, 28 rotate counterclockwise in a scissor-like manner. Outer teeth 29, 30 on the planet gear 15 assembly and teeth 18, 19 on the hubs 17, 17' mate with the pair of output arms 27, 28 to effect the appropriate scissor-like movement as is conventionally available. Furthermore, it will be readily appreciated that the present invention is applicable to any number of configuration of actuators which can incorporate the principles disclosed herein. Also, a daisy-chain of actuators can be provided and connected to a power source by appropriately shaped and sized drive shafts to effect power transmission to each actuator in the daisy-chain.

The replacement of the permanent central shaft with the shaft of the type shown in the FIGURE with the spline arrangement 13 at its end has eliminated the complexity inherent in prior art arrangements which contain a central shaft and has made the actuator mechanism 10 self contained. Two daisy-chain actuators may be coupled together, the shaft can be provided with a male or female coupling and joined to another shaft of the same construction to drive the other actuators from a remote power drive unit.

To provide maximum flexibility so that shafts can be used with actuators in which the shaft is inserted from the right and those in which the shaft is inserted in the left, each axial 31, 32 end of the actuator mechanism body has been left open. Z-shaped annular flanges 33, 34 are connected to the actuator housing 40, and disk-shaped removable dust covers or dirt seals 35 (only one of which is shown) are securely but removably friction fitted to the flanges 33, 34 when the actuator 10 is shipped for installation. As shown, the seal 35 at the left has the dust cover in place inasmuch as the rightmost seal has been removed so that the shaft could be inserted from the right axial end 32. However, even after removal of the dust cover 35, a seal land 36 with an elastomeric ring formed at the inner periphery of the Z-shaped annular flange 34 rides along the body of the shaft 11 to prevent intrusion of dirt and the like into the actuator body after installation of the shaft. It will be appreciated that when the actuator body is shipped for installation, dust covers or plugs 50, only one of which is shown in the drawing, are provided in openings 51 at ends 31, 32 of the actuator housing 40 so that the user can selectively remove a dust cover or plug 50 depending upon how the actuator 10 is installed at the site, i.e.

whether the shaft 11 will be inserted from the right or from the left.

The length of the shaft 11 and the splined section section 13 are also sized such that upon insertion of the shaft, say from the right as shown, the shaft 11 can be moved first to the dotted line position within the sun gear 14 to permit easy installation with an associated power drive unit.

In operation, the drive shaft is rotated and thereby rotates the sun gear 14 which is connected by the spline arrangement 13 to the respective drive shaft 11. As the sun gear 14 rotates, the planet gear 15 rotates about the center line of the drive shaft 11 and also about its own center line about shaft 26 to produce compound motion. The drive shaft 11 can be removed completely from the system leaving no through shaft in place at the center of the actuator structure; thus, the shaft can be inserted from either the left or the right side of the actuator. This arrangement eliminates the center shaft from conventional actuators and greatly simplifies the actuator structure with consequent reduction in weight.

While an embodiment of the present invention has been shown and described, it will be understood that the same is susceptible of numerous changes and modifications. Therefore, the present invention is not limited to the details shown and described herein but is intended to cover all such changes and modifications as are encompassed by the scope of the appended claims.

I claim:

1. An actuator comprising a housing, at least one actuating mechanism movable with respect to the housing, and means arranged within the housing for moving the actuating mechanism, said means for moving comprises a reduction gear mechanism including at least a pair of gear means engageable with each other, one of said pair of gear means being engageable with a drive shaft insertable through at least one opening in the housing, and wherein means are engageable with at least one axial end portion of said one of said pair of gear means and engageable with an inner peripheral portion of the other of said pair of gear means for maintaining said pair of gear means in operative relationship with the at least one actuating mechanism in the absence of the driving shaft.

2. An actuator according to claim 1, wherein the at least one opening is provided at an axial end of the housing for receiving the driving shaft.

3. An actuator according to claim 1, wherein the at least one opening in the housing comprises axially opposed openings in the housing, and each of the openings is adapted to selectively receive the driving shaft therethrough for driving engagement with the moving means thereby enabling said driving shaft to be inserted into the housing from opposite axial sides thereof.

4. An actuator according to claim 1, wherein at least one end of the driving shaft is splined for connection to one of the moving means and the power source.

5. An actuator according to claim 1, wherein each end of the driving shaft is splined for connection with the moving means and the power source, respectively.

6. An actuator comprising a housing, at least one actuating mechanism movable with respect to the housing, and means arranged within the housing for moving the actuating mechanism such that a central area is defined within the housing and is adapted to receive a drive shaft operatively driven by a power source through at least one opening in the housing for driving engagement with the moving means, wherein the moving means comprises a planet gear arrangement operatively associated with the at least one actuating mechanism, and a sun gear adapted to mate with a portion of the driving shaft to provide the driving engagement and with the planet gear arrangement to move the at least one actuating mechanism, wherein the planet gear arrangement and sun gear are held in operative relationship with each other in the absence of the driving shaft.

7. An actuator comprising a housing, at least one actuating mechanism movable with respect to the housing, means arranged within the housing for moving the actuating mechanism such that a central area is defined within the housing and is adapted to receive a drive shaft operatively driven by a power source through at least one opening provided in an axial end of the housing for driving engagement with the moving means, wherein the moving means is a reduction gear mechanism maintained in operative relationship with the at least one actuating mechanism in the absence of the driving shaft, and wherein a cover is removably associated with the at least one opening such that the driving shaft can be inserted therethrough upon removal of the cover.

8. An actuator according to claim 7, wherein a seal is provided between the housing and the driving shaft to prevent intrusion of foreign matter into the housing.

9. An actuator comprising a housing, at least one actuating mechanism movable with respect to the housing, means arranged within the housing for moving the actuating mechanism such that a central area is defined within the housing and is adapted to selectively receive a drive shaft operatively driven by a power source through axially opposed openings in the housing for driving engagement with the moving means, wherein the moving means is a reduction gear mechanism maintained in operative relationship with the at least one actuating mechanism in the absence of the driving shaft, and wherein a cover is removably associated with each of the axially opposed openings so that the driving shaft can be inserted through a selected one of the openings upon a removal of the cover associated therewith.

10. An actuator according to claim 9, wherein a seal is provided in proximity to each of the openings to exclude the intrusion of foreign matter between the housing and the driving shaft.

11. An actuator according to claim 10, wherein the seal and cover at each of the respective axially opposed openings are adapted to be in operative engagement with each other in the absence of the driving shaft.

12. An actuator comprising a housing; at least one actuating mechanism comprising a first arm arrangement moving in a first direction, and a second arm arrangement moving in a second direction opposite to the first direction; and means arranged within the housing for moving the actuating mechanism such that a central area is defined within the housing and is adapted to receive a drive shaft operatively driven by a power source through at least one opening in the housing for driving engagement with the moving means, and wherein the moving means is a reduction gear mechanism maintained in operative relationship with the at least one actuating mechanism in the absence of the driving shaft.

13. An actuator comprising a housing, at least one actuating mechanism movable with respect to the housing, and means arranged within the housing for moving the actuating mechanism such that a central area is defined within the housing and is adapted to receive a drive shaft operatively driven by a power source through at least one opening in the housing for driving engagement with the moving means, wherein each end of the driving shaft is splined for connection with the moving means and the power source, respectively, and wherein the moving means comprises a planet gear arrangement operatively associated with the at least one actuating mechanism, and a sun gear adapted to mate with a portion of the driving shaft to provide the driving engagement and with the planet gear arrangement to move the at least one actuating mechanism, wherein the planet gear arrangement and sun gear are held in operative relationship with each other in the absence of the driving shaft.

14. An actuator comprising a housing, at least one output means for providing an output from the actuator, at least one input means engageable with the output means and with a drive shaft means drivable by a power source and insertable into the housing through at least one opening in the housing, and means engageable with an axial end portion of the at least one input means and engageable with an inner peripheral portion of said at least one output means for retaining an operational position between said at least one input means and the at least one output means upon a removal of the drive shaft means from the housing.

15. An actuator according to claim 14, wherein said at least one output means includes a reduction gear mechanism, and wherein said retaining means retains said operational relationship between said reduction gear mechanism and said at least one input means in the absence of the driving shaft means.

16. An actuator according to claim 14, wherein the at least one opening is provided at an axial end of the housing for receiving the drive shaft means.

17. An actuator according to claim 14, wherein the at least one opening in the housing comprises axially opposed openings, and wherein each of the openings is adapted to selectively receive the drive shaft means therethrough for driving engagement with said at least one input means thereby enabling the drive shaft means to be inserted into the housing from opposite axial sides thereof.

18. An actuator comprising a housing, at least one output means for providing an output from the actuator, at least one input means engageable with said output means, means for maintaining the at least one output means in a fixed positional relationship with respect to said housing, and means retaining the at least one input means in an operative position with said at least one output means so as to define a central area in said housing, said central area being adapted to accommodate a drive shaft means insertable into said central area through at least one opening in the housing for driving engagement with input means and operatively driven by a power source, said retaining means being adapted to retain said operative position between said at least input means and the at least one output means upon a removal of the drive shaft means from the housing, and wherein said at least one output means comprises a planetary gear arrangement, said at least one input means includes a sun gear adapted to mate with a portion of the drive shaft means when the drive shaft means is inserted into the housing and provide for a driving engagement and to mate with the planetary gear arrangement to drive the same, and wherein said retaining means retains the planet gear arrangement and the sun gear inset operative position in the absence of the drive shaft means.

19. An actuator comprising a housing, at least one output means for providing an output from the actuator, at least one input means engageable with said output means, means for maintaining the at least one output means in a fixed positional relationship with respect to said housing, and means retaining the at least one input means in an operative position with said at least one output means so as to define a central area in said housing, said central area being adapted to accommodate a drive shaft means insertable into said central area through at least one opening provided at an axial end of the housing for driving engagement with the input means and operatively driven by a power source, said retaining means being adapted to retain said operative position between said at least one input means and the at least one output means upon a removal of the drive shaft means from the housing, and wherein a cover is removably associated with the at least one opening such that the driving shaft means can be inserted therethrough upon a removal of the cover.

20. An actuator according to claim 19, wherein a seal means is provided between the housing and the drive shaft means to prevent intrusion of foreign matter into the housing.

21. An actuator comprising a housing, at least one output means for providing an output from the actuator including a first arm movable in a first direction and a second arm movable in a second direction opposite to said first direction, at least one input means engageable with said output means, means for maintaining the at least one output means in a fixed positional relationship with respect to said housing, and means retaining the at least one input means in an operative position with said at least one output means so as to define a central area in said housing, said central area being adapted to accommodate a drive shaft means insertable into said central area through at least one opening in the housing for driving engagement with the input means and operatively driven by a power source, said retaining means being adapted to retain said operative position between said at least one input means and the at least one output means upon removal of the drive shaft means from the housing.

22. An actuator according to claim 21, wherein said at least one output means further comprises a reduction gear mechanism, and wherein said retaining means retains said operational relationship between said reduction gear mechanism and said at least one input means in the absence of the driving shaft means.

23. An actuator according to claim 21, wherein said at least one output means further comprises a planet gear arrangement, said at least one input means includes a sun gear adapted to mate with a portion of the driving shaft means when the driving shaft means is inserted into the housing and provide for a driving engagement and to mate with the planetary gear arrangement to drive the same, and wherein said retaining means retains the planet gear arrangement and the sun gear in said operational position in the absence of the driving shaft.

* * * * *